US009680138B2

(12) United States Patent
Ejima

(10) Patent No.: US 9,680,138 B2
(45) Date of Patent: Jun. 13, 2017

(54) BATTERY PACK

(71) Applicant: Panasonic Intellectual Property Management Co., Ltd., Osaka (JP)

(72) Inventor: Tsuneyuki Ejima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 42 days.

(21) Appl. No.: 14/565,918

(22) Filed: Dec. 10, 2014

(65) Prior Publication Data

US 2015/0171389 A1 Jun. 18, 2015

(30) Foreign Application Priority Data

Dec. 13, 2013 (JP) ................................ 2013-257824

(51) Int. Cl.

*H01M 2/10* (2006.01)
*H01M 2/20* (2006.01)
*H01M 10/04* (2006.01)

(52) U.S. Cl.

CPC ......... *H01M 2/1077* (2013.01); *H01M 2/206* (2013.01); *H01M 10/0481* (2013.01); *H01M 2220/20* (2013.01)

(58) Field of Classification Search

None

See application file for complete search history.

(56) References Cited

U.S. PATENT DOCUMENTS

| | | | |
|---|---|---|---|
| 2005/0277012 A1 | 12/2005 | Inagaki | |
| 2006/0170395 A1 | 8/2006 | Yoshimizu et al. | |
| 2011/0177373 A1 | 7/2011 | Pellenc | |
| 2012/0231309 A1 | 9/2012 | Itoi et al. | |
| 2013/0052487 A1 | 2/2013 | Park | |
| 2013/0136975 A1 | 5/2013 | Uchida | |

FOREIGN PATENT DOCUMENTS

| | | |
|---|---|---|
| JP | 62-62763 | 4/1987 |
| JP | 6-203857 | 7/1994 |
| JP | 2001-126991 | 5/2001 |
| JP | 2006-205323 | 8/2006 |
| JP | 2010-538435 | 12/2010 |
| JP | 2012-064470 | 3/2012 |
| JP | 4923314 | 4/2012 |
| JP | 2013-55054 | 3/2013 |
| JP | 2013-120694 | 6/2013 |
| WO | 2012/035683 | 3/2012 |

*Primary Examiner* — Sarah A Slifka

(74) *Attorney, Agent, or Firm* — Wenderoth, Lind & Ponack, L.L.P.

(57) ABSTRACT

Battery cells are fixed by a cell holder and are housed inside a case in a state where both electrodes are sandwiched by a positive-electrode current collecting plate and a negative-electrode current collecting plate, and springs are arranged above and under the current collecting plates. Claws are provided on side surfaces of the case, which can temporarily fix the springs to the current collecting plates at the time of assembly and prevents the case from being ejected suddenly when a fastener is released at the time of disassembly.

20 Claims, 4 Drawing Sheets

BATTERY PACK

BACKGROUND OF THE INVENTION

1. Field of the Invention

The present invention relates to a battery pack.

2. Description of Related Art

A battery pack including plural secondary battery cells can be used repeatedly as a power source by supplying electric energy from outside the battery, that is, by storing electric energy inside the battery by recharging the battery when the residual capacity of the battery is reduced.

As a method of recharging the battery pack, there exists a dedicated charging station in a case of an electric car, and recently, there is a method of recharging the battery from an outlet at home. Other various power supply methods are known in addition to the above at the time of recharging the battery. Especially, in a case of a hybrid car, a generator is actuated by utilizing the power of an engine during running, and generated electricity is stored.

In recent years, a type of a car which can recharge the battery from an outlet at home when the car is stopped has appeared in a hybrid car. There is also a method of recharging the battery by regenerating heat generated at the time of applying a brake in the case of the car.

A related-art battery pack in which battery cells are housed in a metal case and both ends of the cells are connected to current collecting plates is known (for example, refer to Japanese Patent No. 4923314).

FIGS. 4A and 4B are views showing a related-art battery pack described in Japanese Patent No. 4923314.

In FIGS. 4A and 4B, battery cells 110 are housed in a metal block 120 in a state where directions of positive electrodes are aligned.

A positive-electrode current collecting plate 130 is welded to the positive electrode side of the battery cells 110, and a negative-electrode current collecting plate 123 is welded to the negative electrode side. A resin holder 140 is interposed between the positive electrode current collecting plate 130 and the battery cells 110, thereby performing insulation between positive electrodes and negative electrodes and preventing a short circuit. The positive-electrode current collecting plate 130 and the negative-electrode current collecting plate 123 are fixed to the resin holder 140 by screws 150*a*, 150*b*. As typified by the battery pack described in Japanese Patent No. 4923314, a battery pack using lithium-ion rechargeable batteries is normally constructed as a system by combining plural battery cells. In this case, the positive electrodes of respective battery cells are connected to one current collecting plate, the negative electrodes of respective battery cells are connected to one current collecting plate, and a widely used method for the connections is welding.

The battery pack including plural battery cells is difficult to be used as a battery pack when any one cell indicating an abnormal state exists due to some factors. For example, the above-noted state corresponds to cases where electrical characteristics are not satisfied due to the mixture of a battery cell which does not satisfy required characteristics or a welding failure between the positive electrodes/the negative electrodes of the battery cells and the current collection plate in manufacturing processes.

When excessive electric current flows into a particular cell due to a short circuit caused by a foreign object inside the cell or a welding defect with respect to the current collecting plate during the use of the battery pack, one cell can be remarkably deteriorated or the function of the battery can be lost.

In this case, the battery pack can be used again if only the battery cell indicating the abnormal state can be changed, or normal battery cells are collected from plural battery packs and newly combined. However, it is difficult to separate normal battery cells from the current collecting plate without impairing the shape or electrical characteristics when the battery cells and the current collection plates are welded as described in Japanese Patent No. 4923314.

SUMMARY OF THE INVENTION

Accordingly, the present invention has been made for solving the above-noted related-art problems, and an object thereof is to provide a battery pack which operates as the battery pack without problems, capable of removing battery cells by disassembling the battery pack easily and safely as compared with the related-art battery pack and capable of using the removed battery cells again without impairment in positive electrodes and negative electrodes.

In order to achieve the above-noted object, a battery pack according to the present invention is provided with compressed springs between a case and a current collecting plate of the battery pack as well as provided with claws in the case in consideration of safety at the time of assembling and disassembling the battery as described later.

According to the structure, the device can function as a battery as the battery cells constantly contact the current collecting plates by a force of returning the springs to an original length in the above-noted structure, and the battery can be disassembled easily and safely even when the function as a battery pack is impaired due to some defects, therefore, the change of the battery cells as well as reuse of normal battery cells can be easily performed.

As described above, assembly and disassembly can be easily performed by using the battery pack according to the present invention.

When a failure occurs due to abnormality of a battery cell, only the failed battery cell can be easily changed even after assembly of the battery pack has been completed. Even in a case of a battery which has been used for a long period of time as an in-vehicle battery and has come to the end of its life due to capacity deterioration, the battery pack can be easily disassembled and battery cells can be used again when they are useful in other applications.

DESCRIPTION OF EMBODIMENTS

Hereinafter, embodiments of the present invention will be explained with reference to the drawings.

Embodiment 1

Figure 1A:
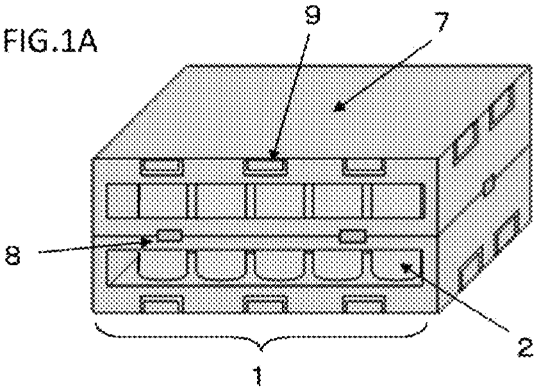
FIGS. 1A to 1C are general views of a battery pack according to the present invention.
Figure 1B:
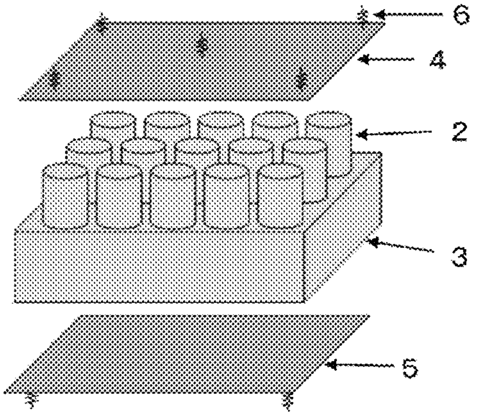
Figure 1C:
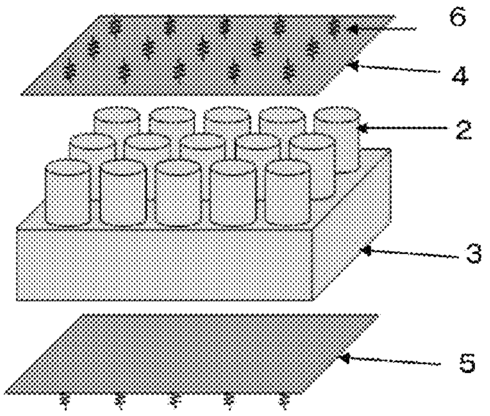

FIGS. 1A to 1C are general views showing a battery pack according to Embodiment 1 of the present invention. In FIGS. 1A to 1C, a battery pack 1 includes battery cells 2, a cell holder 3, a positive-electrode current collection plate 4, a negative-electrode current collection plate 5, springs 6 and a case 7. FIG. 1A shows a state where the battery pack 1 has been assembled and FIG. 1B shows a structure of parts inside the case 7.

The number of battery cells 2 included in the battery pack 1 is determined based on the performance required for the battery such as the necessary capacity and voltage, therefore, it is not particularly limited. The battery cells 2 are arranged so that directions of all positive electrodes and negative electrodes are aligned.

The number of cell holders 3 provided in one battery pack 1 is one or two. The cell holder 3 serves a function of holding the battery cells 2. The connection between the cell holder 3 and the current collection plate must not be broken when some external load is generated during operation of the battery or when the battery cells 2 are inclined at the time of assembling the battery pack 1.

In order to prevent the above, when one cell holder is provided, the height of the cell holder 3 for holding the battery cells 2 is desirably set to 20% or more of the height of the cells, and when two cell holders are provided, each height of the cell holders 3 is set to 10% or more of the height of the cells.

A material of the cell holder 3 is not particularly limited, and may be selected according to characteristics of the battery. It is suitable to use, for example, a resin material with low thermal conductivity or the like as heat propagation to adjacent battery cells can be suppressed. In this case, the height of the cell holder 3 is desirably as small as possible in the above-described range.

When focusing on the suppression of temperature increase of the cells during normal use, a metal material with high thermal conductivity such as aluminum is preferably used. In this case, it is desirable to set the height of the cell holder 3 to be higher as the thermal conductivity is increased.

The positive-electrode current collecting plate 4 is connected to the battery cells 2 in the positive electrode side and the negative-electrode current collecting plate 5 is connected to the battery cells 2 in the negative electrode side. As it is necessary that the current collecting plate is connected to the current collection plate of another battery pack 1, a terminal is extended to the outside of the case 7.

Figure 2A:
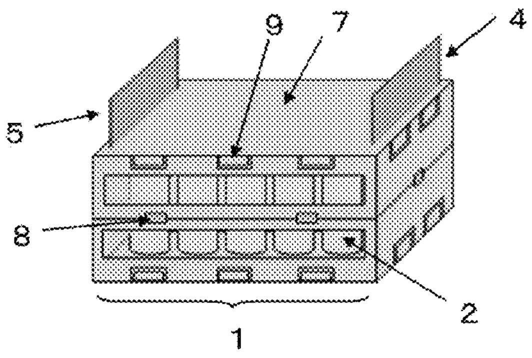
FIGS. 2A to 2C are views showing arrangements of terminals of current collecting plates in the battery pack according to the present invention.
Figure 2B:
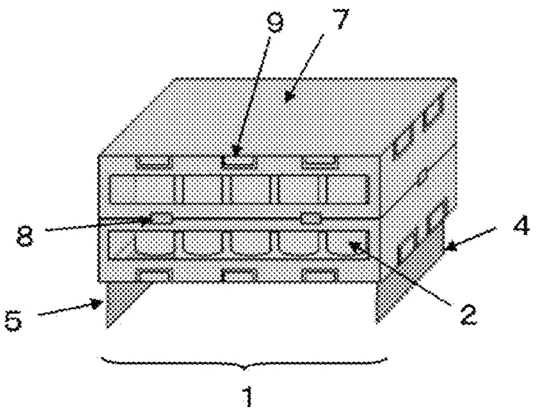
Figure 2C:
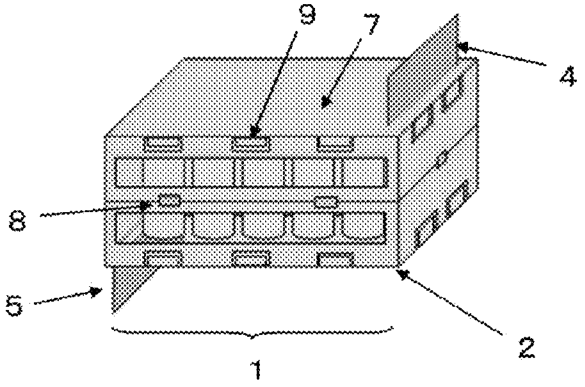

It is possible to apply a method in which both terminals are arranged in the positive electrode side or the negative electrode side as shown in FIGS. 2A and 2B as well as a method in which terminals are arranged to be separated in the positive electrode side and the negative electrode side as shown in FIG. 2C. Note that portions of the terminals of the current collection plates, which protrude from the case are not shown in the drawings other than FIGS. 2A to 2C for convenience.

The battery cells 2, the cell holder 3, the positive-electrode current collecting plate 4 and the negative-electrode current collecting plate 5 are housed inside the case 7.

At least one spring 6 is arranged between the positive-electrode current collecting plate 4/the negative-electrode current collecting plate 5 and the case 7. The battery pack 1 is formed in a state where the springs 6 are compressed.

At this time, a distance L between a top surface (positive side) and a floor surface (negative side) of the case 7 is equal to a sum of lengths obtained when the springs 6 in the positive electrode side and the negative electrode side are compressed (1a and 1b respectively), a thickness D of the positive-electrode current collecting plate 4 and a thickness "d" of the negative-electrode current collecting plate 5 and a height "h" of the battery cells 2. That is, the following expression holds.

$$L=h+D+d+1a+1b$$

The battery cells 2 are allowed to contact the two current collecting plates by utilizing a force of returning the compressed springs 6 to the natural length, thereby performing electrical connection.

According to the above-noted structure, even when any of positions of the battery cells 2, the positive-electrode current collecting plate 4 and the negative-electrode current collecting plate 5 is displaced due to reception of some external load, the displacement can be absorbed by the compressed springs 6, therefore, the contact state between the battery cells and the current collecting plates can be constantly kept and the electric current is not disrupted.

Although the number of the springs 6 is not particularly limited, it is desirable that the springs 6 are arranged at least at five places in total, which are the center and four corners of the current collecting plate as shown in FIG. 1B as the current collecting plate can be separated from the battery cells when some external load is generated at places where the springs are not arranged.

When a vibration load is frequently applied and a large load is assumed by mounting on an electric car or a hybrid car, it is desirable to arrange the springs 6 at least just above the battery cells and just below the battery cells so as to correspond to the number of battery cells.

An object of the battery pack 1 according to the present invention is to allow the battery cells 2 to be used again as described later. Accordingly, a structure in which the battery cells 2 are not bonded to the current collecting plates is applied, however, the springs 6 may be bonded to the positive-electrode collecting plate 4 and the negative-electrode collecting plate 5 by means of welding and the like.

The case 7 has a structure which is vertically separated into two and is easily opened and closed by a fastener 8. The case 7 may also have a structure in which the battery cells 2 housed inside are completely enclosed.

In the case where cooling of the battery cells 2 is necessary as shown in FIG. 1A, openings for allowing a refrigerant to flow therethrough may be provided. When the openings are provided, the openings are provided on side surfaces not contacting the springs of the case 7, which can be the long-edge side as well as the short-edge side, however, the openings have to be provided on two facing surfaces for allowing the refrigerant to flow efficiently inside the battery pack 1.

It is desirable that a material of the case 7 has high insulating performance such as a resin material, however, it is not particularly limited as long as insulation in the outside of the battery pack 1 is secured as well as the case 7 is electrically insulated from the positive-electrode current collecting plate 4, the negative-electrode current collecting plate 5 and the springs 6 by methods such as applying an insulating material or adhering an insulating thin film on the surface of the case.

The battery pack 1 according to the present invention has a structure in which the battery cells 2 are fixed by the cell holder 3 and are sandwiched by the positive-electrode current collecting plate 4 and the negative-electrode current collecting plate 5 from both electrodes, and further, the battery cells 2 are surrounded by the case from an upper side and a lower side in a state where the springs are disposed above and below the two current collecting plates, and an upper portion of the case and a lower portion of the case are fixed by the fastener 8.

In order to close the upper portion of the case and the lower portion of the case after the all components inside the case 7 are arranged at the time of assembling the battery pack 1, it is necessary to fix the fastener 8 in a state where the case is pressed by a large force from an upper side and a lower side for compressing the springs. It is dangerous to perform the above work by human hands. There is also a danger of the case 7 being suddenly ejected when the fastener 8 is released at the time of disassembling the battery pack 1 as a large force of returning the compressed springs 6 to the natural length is exerted.

Figure 3A:
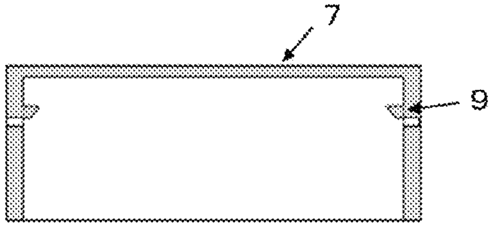
FIGS. 3A to 3D are views showing claws provided in a case of the battery pack according to the present invention.
Figure 3B:
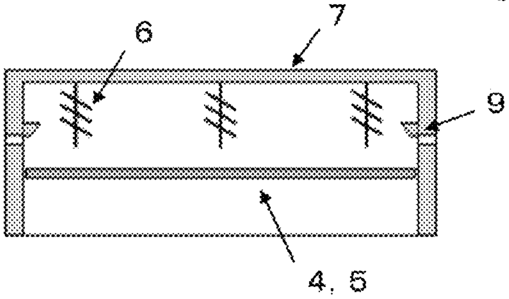
Figure 3C:
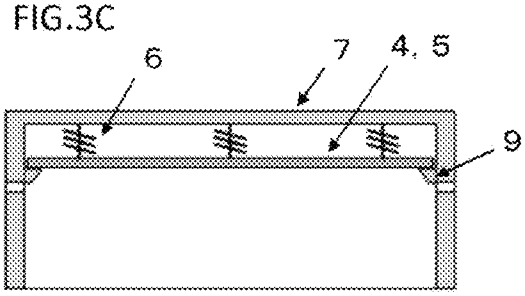

In order to solve the above-noted problems and perform assembly and disassembly safely, the case 7 of the battery pack 1 according to the present invention is provided with claws 9 in an upper part of a side surface of the upper case and a lower part of a side surface of the lower case as shown in FIG. 3A. When performing assembly, the springs 6 are arranged between the positive-electrode current collecting plate 4 or the negative-electrode current collecting plate 5 and the case 7 as shown in FIG. 3B, and the current collecting plate is pushed into the case 7 so that the springs 6 are compressed as shown in FIG. 3C.

After the current collecting plate is completely pushed to the position of the claws 9, the current collecting plate does not move beyond the position of the claws 9 even when the force of returning the compressed springs 6 to the natural length is exerted.

It is necessary to arrange at least one or more claws 9 at each surface on both sides of the case 7 on the long side. When the claws 9 are arranged only in the long side, it is preferable that one claw 9 having a width slightly shorter than the length of the side surface is provided, or that two or more claws 9 to be arranged at least in two places near both ends of the current collecting plate are provided. The claws 9 can be provided also on the short side if structurally possible.

Figure 3D:
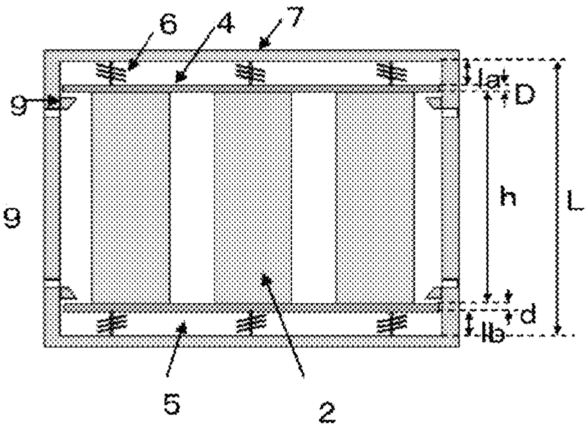
Figure 4A:
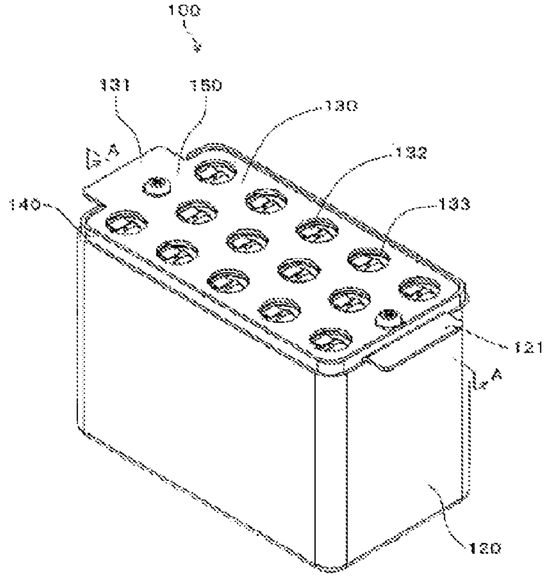
FIGS. 4A and 4B are views showing a battery block of a related-art battery pack described in Japanese Patent No. 4923314.
Figure 4B:
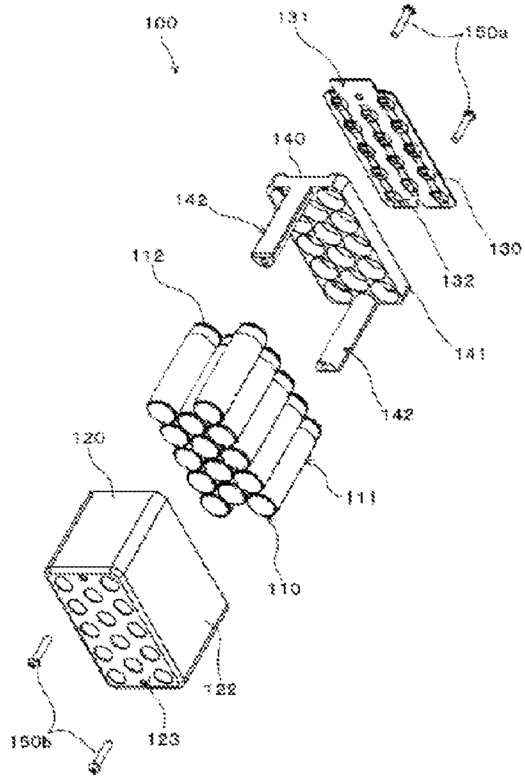

In the above-noted state, the battery cells 2 fixed to the cell holder 3 are interposed between the cases as shown in FIG. 3D and the fastener 8 is fixed, thereby completing the battery pack. When the fastener 8 is released and opened at the time of disassembling the battery pack, the current collecting plates do not move beyond the positions of the claws 9 though the springs 6 are to be expanded, as a result, the case does not suddenly eject and disassembly can be performed safely.

In order to further increase safety during the work, a jig for supporting the case or the current collecting plate may be used at the time of attaching the current collecting plate to the case or at the time of connecting or opening an upper portion of the case or a lower portion of the case. Especially at the time of disassembly, the battery pack can be disassembled extremely safely by fixing the battery pack 1 to the jig first, opening the fastener 8 in that state, and gradually moving the jig.

It is necessary that flat surfaces of the claws 9 which receive the current collecting plate are positioned closer to the center of the cells with respect to top surfaces or bottom surfaces of the cells in the state of the battery pack 1 for allowing the claws 9 of the case 7 to serve the above-noted function. When the flat surfaces receiving the current collecting plate are positioned farther from the center of the cells with respect to the top surfaces or the bottom surfaces of the cells, a gap is generated between the cells and the current collecting plate when the assembly is completed as the battery pack, which interrupts electrical connection.

When both claws 9 are positioned at the same level, the contact between the cells and the current collecting plate is held in the state where assembly is completed. For example, if the case is deformed due to the effect of vibration generated at the time of running of the car during use as an in-vehicle battery, there is a possibility that the electrical connection is broken as the cells are separated from the current collecting plate.

Accordingly, a distance between the flat surface receiving the current collecting plate and the top surface or the bottom surface of the case is larger than the distance between the top surfaces or the bottom surfaces of the cells and the top surface or the bottom surface of the case, however, in the case where the distance is too large, it is difficult to achieve the object of safe assembly or disassembly.

The flat surface receiving the current collecting plate is preferably positioned approximately 0.5 mm to 2 mm closer to the center of the cells with respect to the position of the top surfaces or the bottom surfaces of the battery cells when assembly of the battery pack is completed. The reason why approximately 0.5 mm to 2 mm is preferable is based on knowledge in which it is necessary to secure at least 0.5 mm or more as the lower limit when considering the tolerance of the parts as 0.2=, and it becomes difficult to perform disassembly safely when the distance is longer than 2 mm as the upper limit though the springs are extended to a position where the current collecting plate is caught by the claws when the device is disassembled.

The shape of the claws 9 is a pentagonal prism in FIGS. 3A to 3D, however, it is not particularly limited as long as the flat surface as a contact surface with respect to the current collecting plate is secured.

The area of the flat surface as the contact surface with respect to the current collecting plate is not particularly limited, however, when the area is increased, the volume of the battery pack 1 is increased and energy density is reduced, therefore, it is preferable that the area is smaller. When the positive-electrode current collecting plate 4 or the negative-electrode current collecting plate 5 and the springs 6 are attached to the case 7, the claws 9 are pushed by the force of the springs. As a stress generated in the claws 9 at this time must not exceed a yield stress of the material used for the case 7, the smallest area is determined according to the material.

In the battery pack 1 having the above-noted structure, it is easy to assemble or disassemble the battery and the battery cells 2 are not welded to the current collecting plate, therefore, the battery cells are removed without damage at the time of disassembly, which enables recycling.

Even when a failure is discovered in a battery cell at the time of manufacturing, the corresponding cell itself can be easily changed, therefore, a yield of the battery pack can be improved.

Embodiment 2

The case where all the positive electrodes/the negative electrodes of the battery cells 2 are aligned in the same direction has been explained in Embodiment 1. The present invention can be applied to a case where the positive electrodes and the negative electrodes are alternately aligned in adjacent cells.

In this case, it is difficult to use a piece of a positive-electrode current collecting plate 4 or a negative-electrode current collecting plate 5 shown in Embodiment 1. However, a current collecting plate is formed by adhering terminals connecting between positive electrodes and negative electrodes of adjacent cells to a piece of plate having insulation performance, thereby fabricating a battery pack 1 similar to Embodiment 1.

Embodiment 3

The battery cells 2 having a cylindrical shape are used in Embodiment 1, however, battery cells having a square shape can be used. The square-shape cell has the positive electrode and the negative electrode on the same surface, which differs from the cylindrical cell. Accordingly, it is sufficient that the claws 9 of the resin case 7 shown in Embodiment 1 are provided only in one side of the case.

As it is difficult to use a piece of a current collecting plate as shown in Embodiment 1 in the square-shape battery, the plate in which terminals are adhered to the plate having insulation performance is preferably used in the same manner as Embodiment 2.

The present invention can be applied to transportation equipment such as the electric car and the hybrid car as well as applications of a storage battery at home, a stock power supply used in case of emergency.

What is claimed is:

1. A battery pack comprising:
plural battery cells;
a holder holding the battery cells;
a current collecting plate electrically connected to the battery cells;
a pair of cases housing the battery cells, the holder and the current collecting plate;
a fastener outside the pair of cases to thereby fix the pair of cases to each other;
claws extending from at least two long-side inner surfaces of one of the pair of cases toward the inside of the one of the pair of cases; and
plural springs between the current collecting plate and the one of the pair of cases so as to bias the current collecting plate toward the claws;
wherein the claws are at positions such that each of the springs is compressed between the current collecting plate and the one of the pair of cases and cannot return to an original uncompressed length thereof.

2. The battery pack according to claim 1,
wherein the number of springs is the same as the number of battery cells, and
the springs are arranged above axes of the battery cells, respectively.

3. The battery pack according to claim 2,
wherein at least one additional claw is in a short-side inner surface of the one of the pair of cases.

4. The battery pack according to claim 1,
wherein at least one additional claw is in a short-side inner surface of the one of the pair of cases.

5. The battery pack according to claim 1,
wherein a height of the holder is 20% or more of a height of each of the battery cells.

6. The battery pack according to claim 1,
wherein the holder is a first holder and the battery pack further comprises a second holder, and
wherein a height of each of the first holder and the second holder is 10% or more of a height of each of the battery cells.

7. The battery pack according to claim 1,
wherein the holder comprises resin.

8. The battery pack according to claim 1,
wherein the holder comprises metal.

9. The battery pack according to claim 1, further comprising a terminal,
wherein the terminal extends outside the pair of cases.

10. The battery pack according to claim 1,
wherein the springs include five springs, and
wherein four of the five spring are at four corners of the current collecting plate and one of the five spring is at a center of the current collecting plate.

11. The battery pack according to claim 1,
wherein the springs are bonded to the current collecting plate.

12. The battery pack according to claim 1,
wherein openings are defined in the pair of cases for allowing a refrigerant to flow therethrough.

13. The battery pack according to claim 1,
wherein the openings are defined in facing surfaces of the pair of cases.

14. The battery pack according to claim 1,
wherein each of the pair of cases comprises resin.

15. The battery pack according to claim 1, further comprising an insulating material on the pair of cases.

16. The battery pack according to claim 1,
wherein each of the claws has a width that is shorter than a length of the corresponding long-side inner surface of the one of the pair of cases.

17. The battery pack according to claim 1,
wherein a surface of each claw that receives the current collecting plate is positioned 0.5 mm to 2 mm closer to a center of each of the battery cells than a top surface or a bottom surface of each of the battery cells.

18. The battery pack according to claim 1,
wherein each of the claws has a pentagonal prism shape.

19. The battery pack according to claim 1,
wherein the current collecting plate is a first current collecting plate, the claws are first claws and the springs are first springs, and the battery pack further comprises a second current collecting plate, second claws and second springs, and
wherein the second claws extend from at least two long-side inner surfaces of another of the pair of cases toward the inside of the other of the pair of cases and the second springs are between the second current collecting plate and the other of the pair of cases.

20. The battery pack according to claim 19,
wherein a distance "L" between a top surface of the one of the pair of cases and a bottom surface of the other of the pair of cases is equal to a sum of a length of the first springs when compressed "1a" and a length of the second springs when compressed "1b", a thickness "D" of the first current collecting plate and a thickness "d" of the second current collecting plate and a height "h" of the battery cells such that: $L=h+D+d+1a+1b$.

* * * * *